(12) United States Patent
Reddy Asani et al.

(10) Patent No.: US 10,059,249 B2
(45) Date of Patent: Aug. 28, 2018

(54) COMPACT AND REUSABLE SHIPPING ATTACHMENTS FOR SECURING HEAVY MACHINERY ON A DECK

(71) Applicant: General Electric Company, Schenectady, NY (US)

(72) Inventors: Likhith Reddy Asani, Karnataka (IN); Dinesh Venugopal Setty, Karnataka (IN); Jeffrey Patrick Mills, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 81 days.

(21) Appl. No.: 15/243,045

(22) Filed: Aug. 22, 2016

(65) Prior Publication Data

US 2018/0050629 A1 Feb. 22, 2018

(51) Int. Cl.
- *B60P 7/13* (2006.01)
- *B60P 7/135* (2006.01)
- *B60P 3/00* (2006.01)

(52) U.S. Cl.
CPC ............. *B60P 7/135* (2013.01); *B60P 3/00* (2013.01)

(58) Field of Classification Search
CPC ......... B60P 3/073; B60P 3/062; B60P 3/1066; B60P 3/40; B60P 3/1033; B60P 3/1075
USPC ........ 410/44, 46, 49, 156, 34, 42, 47, 87, 2; 280/404, 405.1; 29/281.1, 281.4, 281.6, 29/559
See application file for complete search history.

(56) References Cited

U.S. PATENT DOCUMENTS

| | | | |
|---|---|---|---|
| 3,388,437 A * | 6/1968 | Stoddard | B61D 45/001 410/156 |
| 5,529,447 A * | 6/1996 | Bruns | A01D 75/002 410/156 |
| 6,292,999 B1 | 9/2001 | Rossway et al. | |
| 6,298,536 B1 | 10/2001 | Rossway et al. | |
| 6,334,746 B1 | 1/2002 | Nguyen et al. | |
| 6,793,458 B2 * | 9/2004 | Kawai | F01D 25/28 248/671 |
| 7,963,542 B2 | 6/2011 | Doll et al. | |
| 8,506,218 B2 * | 8/2013 | Delgado Matarranz | F03D 13/40 410/34 |
| 8,876,448 B1 | 11/2014 | Hess et al. | |
| 2014/0161555 A1 * | 6/2014 | Adams | B65D 88/52 410/46 |

* cited by examiner

*Primary Examiner* — D Glenn Dayoan
*Assistant Examiner* — Sunsurraye Westbrook
(74) *Attorney, Agent, or Firm* — Nixon & Vanderhye P.C.

(57) ABSTRACT

An assembly for securing machinery such as a gas turbine on a deck includes a first block unit configured to restrict vertical displacement of the machinery relative to the deck, and a second block unit configured to restrict axial and lateral displacement of the machinery. The first block unit includes a base block securable to the deck and an attachment block secured to the base block. The second block unit is engageable with the machinery base.

19 Claims, 4 Drawing Sheets

COMPACT AND REUSABLE SHIPPING ATTACHMENTS FOR SECURING HEAVY MACHINERY ON A DECK

BACKGROUND OF THE INVENTION

The invention relates to shipping support structure and, more particularly, to compact and reusable shipping attachments for securing heavy machinery on a deck such as a shipping deck.

Gas turbines are currently shipped in a three-point support configuration using heavy support shipping brackets on the forward and aft portion of a gas turbine base. The heavy support brackets are welded to the deck using a multi-layer 3 inch weld. Once the gas turbine is placed on the deck, the brackets are bolted to the gas turbine base using approximately 40 bolts. Installation of the existing configuration is burdensome and time-consuming as the heavy brackets require special equipment for lifting, and the multi-layer welds typically take 2-3 times the normal welding time with increased exposure to weld heat fumes. Additionally, connecting the many bolts to secure the shipping brackets to the gas turbine base is also time-consuming. Still further, once the gas turbine is shipped to the destination, the brackets are unbolted for removal, which is also labor intensive.

BRIEF SUMMARY OF THE INVENTION

In an exemplary embodiment, an assembly for securing machinery on a deck includes a first block unit configured to restrict vertical displacement of the machinery relative to the deck, and a second block unit configured to restrict axial and lateral displacement of the machinery. The first block unit includes a base block securable to the deck and having an upwardly facing support surface. An attachment block is secured to the upwardly facing support surface and extends axially beyond a boundary of the base block. The second block unit includes a through-hole and a pin positioned in the through-hole, where the pin is extendable into the machinery base.

In another exemplary embodiment, the machinery base includes a front end piece, a back end piece, and side pieces connected between the front end piece and the back end piece. The assembly includes a pair of first block units configured to restrict vertical displacement of the machinery relative to the deck, and a pair of second block units configured to restrict axial and lateral displacement of the machinery and securable to the deck. The first block units each include a base block securable to the deck and adjacent the front end piece and the back end piece of the machinery base, respectively. An attachment block is secured to the base block and extends axially over the front end piece and the back end piece, respectively. Each of the second block units is respectively engageable with one of the side pieces of the machinery base.

In another exemplary embodiment, a shipping configuration utilizes the described assembly for securing machinery on a deck. The first block unit is welded to the deck, and the second block unit is secured to the deck with at least one connecting bolt extending through the second block unit into the deck.

DETAILED DESCRIPTION OF THE INVENTION

The assembly of the described embodiments embodies a robust, compact and reusable support system for securing heavy machinery during shipment. The system utilizes block units that are configured to resist displacement of the heavy machinery during shipment in vertical, axial and lateral directions. The assembly also incorporates adjustment features to match variations in base frame heights. In the context of the present description, the term "vertical" is relative to gravity, the term "axial" refers to a traveling direction or forward direction of the shipping vehicle, and the term "lateral" refers to side-to-side directions. Although the embodiments will be described in the context of an application to a gas turbine, the assembly is suitable for use with heavy machinery generally, and the description is not intended to be limiting.

Figure 1:
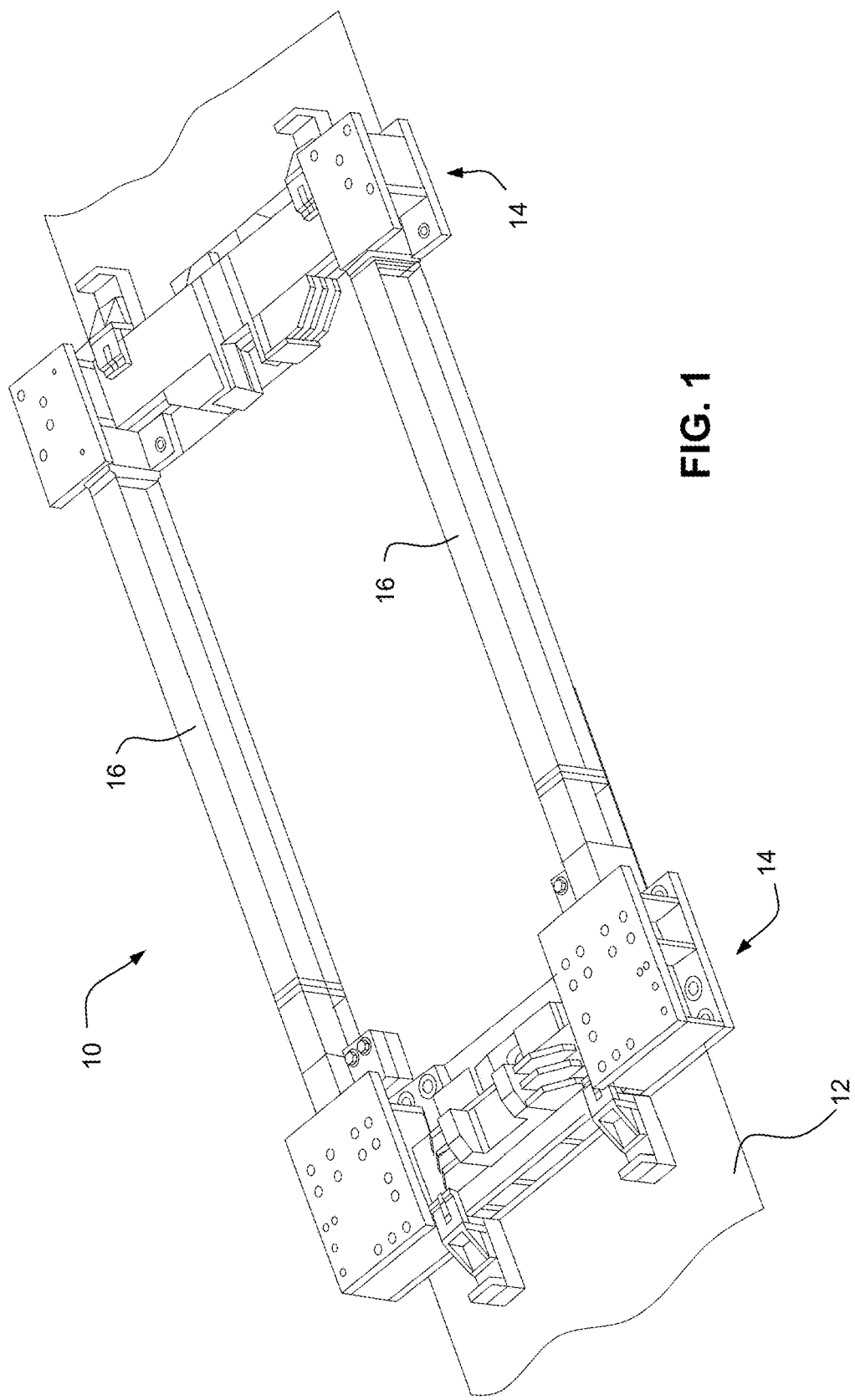
FIG. 1 is a perspective view of a gas turbine base secured to a deck with the assembly of the described embodiments.
Figure 2:
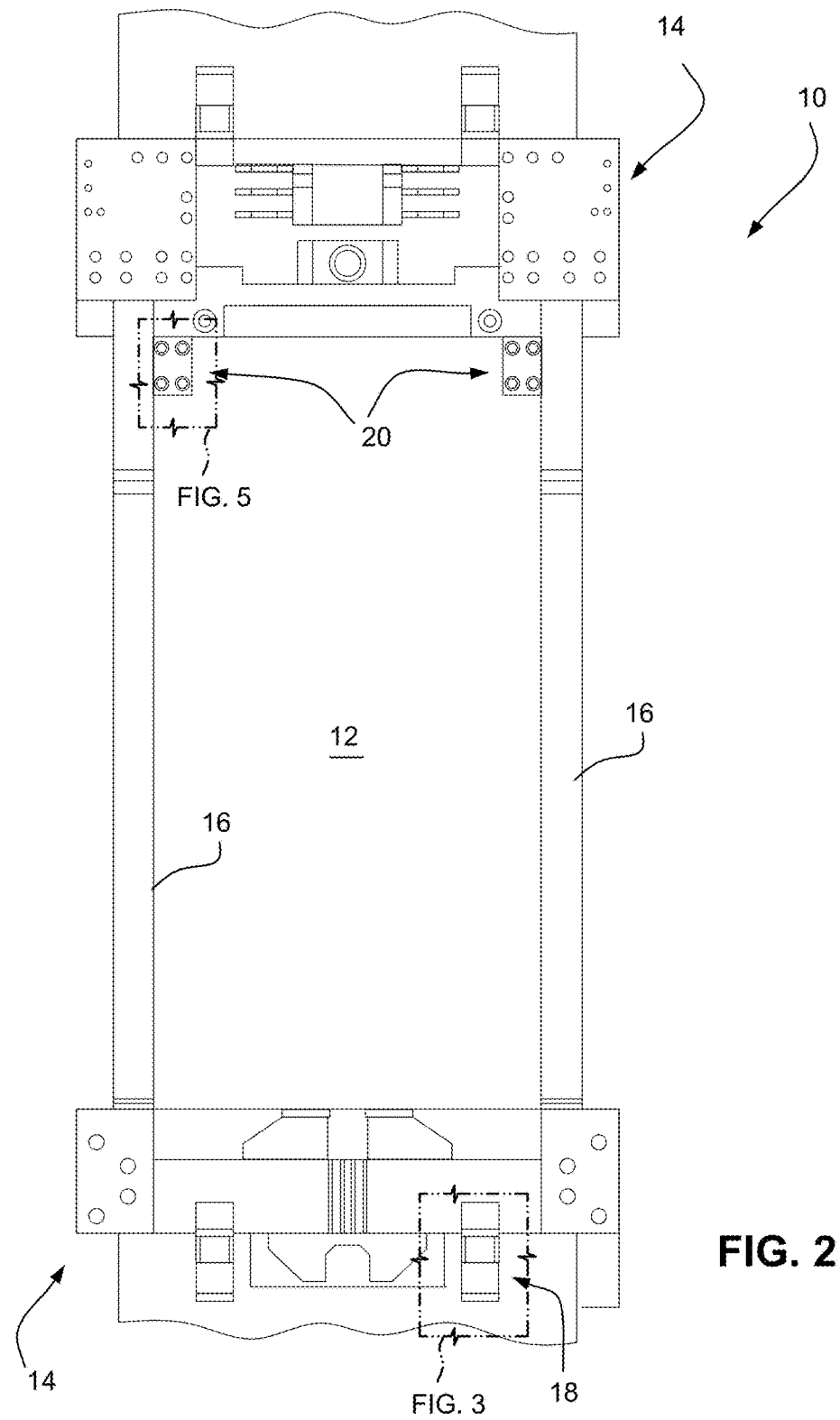
FIG. 2 is a plan view of the gas turbine base.

FIGS. 1 and 2 show a gas turbine base 10 set on a deck 12. The deck 12 may form part of any mode of transport including road, marine, rail car and the like. Generally, the machinery base 10 includes front and back end pieces 14 and side pieces 16 connected between the front and back end pieces 14. The assembly for securing the machinery on the deck 12 includes forward and aft block units or first block units 18 that are configured to restrict vertical displacement of the machinery relative to the deck 12 and central blocks or second block units 20 that are configured to restrict axial and lateral displacement of the machinery.

Figure 3:
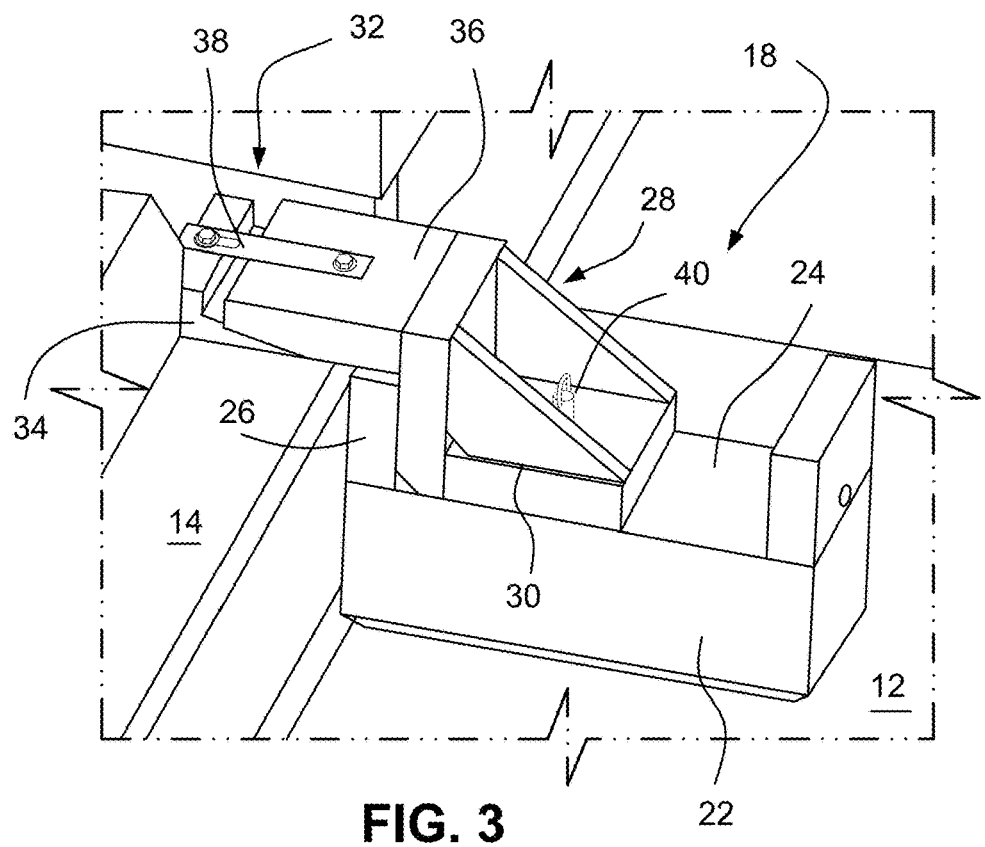
FIGS. 3 and 4 show the first block unit of the assembly.
Figure 4:
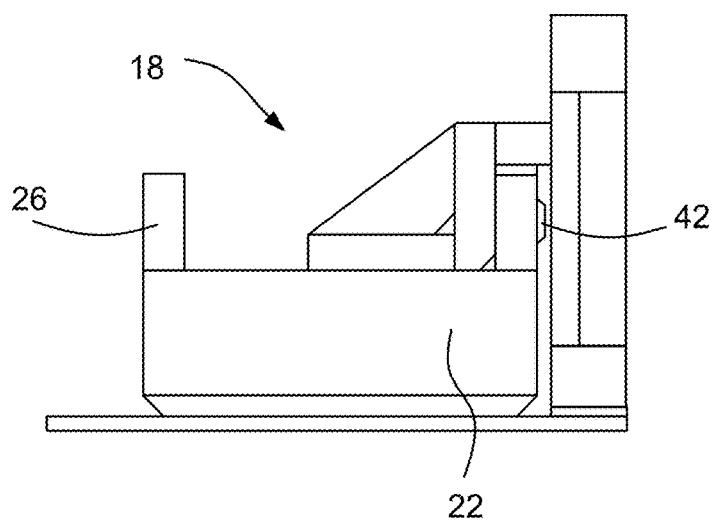

FIGS. 3 and 4 are close-up views of the first block unit 18. The first block unit 18 includes a base block 22 that is securable to the deck and has an upwardly facing support surface 24. The base block 22 also includes at least one end wall 26 extending upwardly above the support surface 24. Two end walls 26 are shown in FIG. 3. The first block unit 18 also includes an attachment block 28 secured to the upwardly facing support surface 24. The attachment block 28 includes a base section 30 secured to the base block 22 and a height adjusting section 32 secured to the base section 30. As shown, the height adjusting section 32 extends axially beyond a boundary of the base block 22. That is, the height adjusting section 32 extends axially over the end wall 26 beyond an axial boundary of the end wall 26.

The height adjusting section 32 includes a first part 34 engageable with the machinery base, a second part 36 positioned over the first part 34, and a connector 38 connected between the first part 34 and the second part 36. With continued reference to FIG. 3, an upper surface of the first part 34 is provided with an incline, and a lower surface of the second part 36 is provided with a reverse or complementary incline, defining a two-part wedge. A height of the height adjusting section 32 is a function of the relative axial position of the first part 34 and the second part 36. The connector 38 secures the first and second parts 34, 36 of the height adjusting section 32 once the height adjusting section 32 is suitably positioned relative to a height of the machinery base.

The component parts of the attachment block 28 may be welded and reinforced with side support plates or the like as shown. In some embodiments, the attachment block 28 is secured to the support surface 24 with a suitable connector 40 such as a shear pin or the like and is also secured to the end wall 26 of the base block 22 with a connector 42 such as a bolt or the like. The base block 22 may be welded to the deck 12 using a single-pass 1 inch weld.

Figure 5:
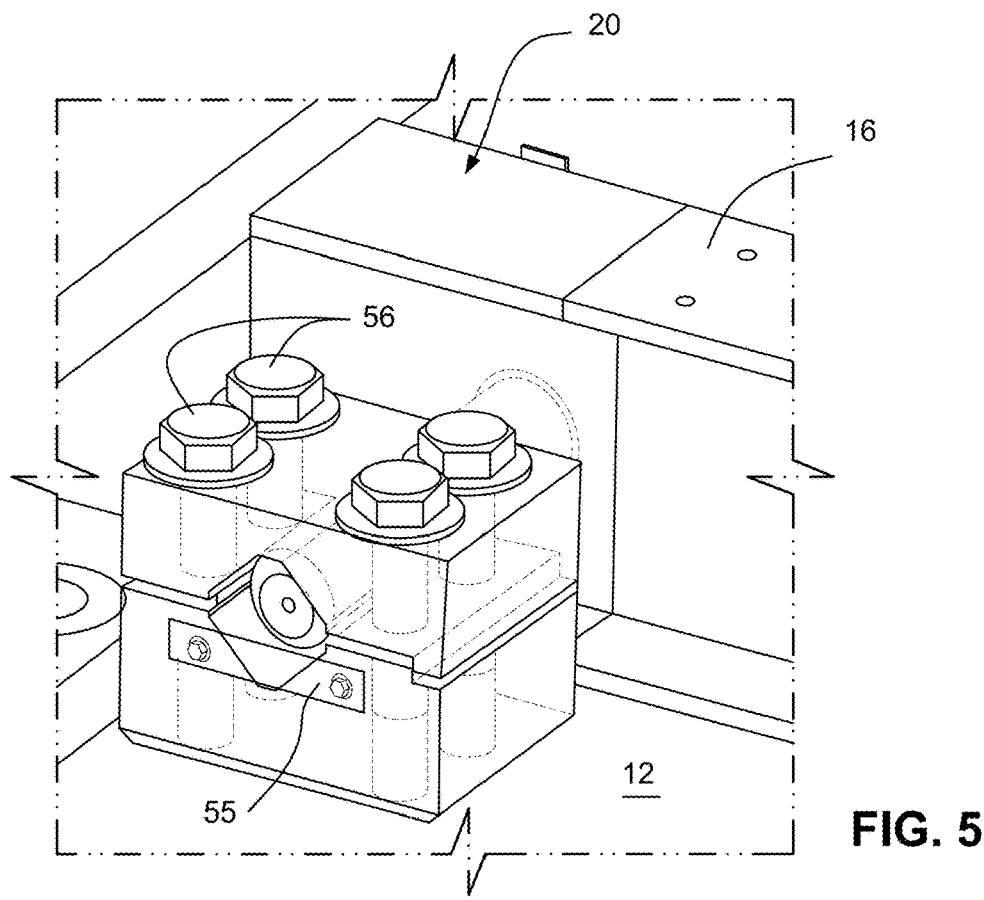
FIGS. 5 and 6 show the second block unit of the assembly.
Figure 6:
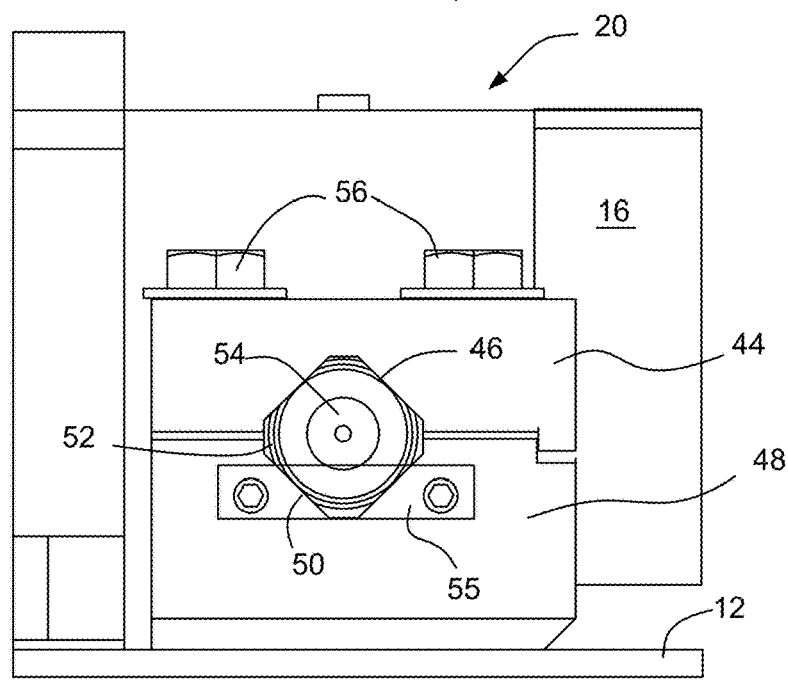

FIGS. 5 and 6 are close-up views of the second block unit 20. In some embodiments, the second block unit 20 includes a top half piece 44 with a downwardly facing groove 46 therein and a bottom half piece 48 with an upwardly facing groove 50 therein. The downwardly facing groove 46 and the upwardly facing groove 50 define a through hole 52 that receives a locking pin 54. A strip member 55 is positioned across at least a portion of an opening of the through hole 52. The locking pin 54 extends through the second block unit 20 and into the side piece 16 of the machinery base 10. The top half piece 44 and the bottom half piece 48 of the second block unit may be connected to each other with at least one connecting bolt 56 extending through the top half piece 44 and the bottom half piece 48. As shown, four of the connecting bolts 56 are secured through the second block unit 20. The connecting bolts 56 may be sized to extend into the deck 12 to also secure the second block unit 20 to the deck 12.

Referring again to FIGS. 1 and 2, in some embodiments, the shipping configuration includes four of the first block units 18, two each engaging the front and back end pieces 14 of the machinery base 10, respectively, and two of the second block units 20, one each engaging the side pieces 16 of the machinery base 10. During transport, the first block units 18 are secured forward and aft as shown and restrict vertical displacement of the machinery relative to the deck. The second block units 20 or central blocks restrict axial and lateral displacement of the machinery due to axial and lateral loads on the machinery during transport. The modular nature of the block units 18, 20 and adjustment features add versatility to the assembly and can be suitably configured to match different base heights.

The assembly of the described embodiments uses lightweight and easily detachable pin and block assemblies to secure heavy machinery during transport. The assemblies are generally 50% lighter than existing shipping attachments. The assembly reduces the welding requirements and installation time by 50% or more as compared to traditional supporting brackets. The support system is designed for road, marine and rail car modes of transport, meeting stringent requirements of regulating authorities. Central blocks prevent the machinery from axial and lateral loads while forward and aft blocks prevent the machinery from lifting during transport. The assembly has adjustable features to interface with different machinery bases and can be leveraged across other frames.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An assembly for securing machinery on a deck, the machinery having a machinery base, the assembly comprising:
    a first block unit configured to restrict vertical displacement of the machinery relative to the deck, the first block unit including a base block securable to the deck and having an upwardly facing support surface, and an attachment block secured to the upwardly facing support surface and extending axially beyond a boundary of the base block such that the attachment block is configured to extend over the machinery base; and
    a second block unit configured to restrict axial and lateral displacement of the machinery and securable to the deck, the second block unit including a through-hole and a pin positioned in the through-hole, wherein the pin is extendable into the machinery base, wherein the second block unit comprises a top half piece with a downwardly facing groove therein and a bottom half piece with an upwardly facing groove therein, the downwardly facing groove and the upwardly facing groove defining the through-hole, wherein the top half piece and the bottom half piece are connected to each other with at least one connecting bolt extending through the top half piece and the bottom half piece.

2. An assembly according to claim 1, wherein the base block of the first block unit comprises an end wall extending upwardly above the support surface, and wherein the attachment block is secured to the end wall and extends axially over the end wall.

3. An assembly according to claim 2, wherein the attachment block comprises a base section secured to the base block and a height adjusting section secured to the base section, the height adjusting section extending axially beyond the boundary of the base block and being height adjustable to accommodate varying machinery base heights.

4. An assembly according to claim 3, wherein the height adjusting section comprises a first part engageable with the machinery base, a second part positioned over the first part, and a connector connected between the first part and the second part, wherein an upper surface of the first part comprises an incline and a lower surface of the second part comprises a reverse incline defining a two-part wedge, and wherein a height of the height adjusting section is a function of a relative axial position of the first part and the second part.

5. An assembly for securing machinery on a deck, the machinery having a machinery base, the assembly comprising:
    a first block unit configured to restrict vertical displacement of the machinery relative to the deck, the first block unit including a base block securable to the deck and having an upwardly facing support surface, and an attachment block secured to the upwardly facing support surface and extending axially beyond a boundary of the base block; and
    a second block unit configured to restrict axial and lateral displacement of the machinery and securable to the deck, the second block unit including a through-hole and a pin positioned in the through-hole, wherein the pin is extendable into the machinery base, wherein the base block of the first block unit comprises an end wall extending upwardly above the support surface, and wherein the attachment block is secured to the end wall and extends axially over the end wall, wherein the attachment block comprises a base section secured to the base block and a height adjusting section secured to the base section, the height adjusting section extending axially beyond the boundary of the base block and being height adjustable to accommodate varying machinery base heights, and wherein the base section of the attachment block is secured to the support surface with a first connector and is secured to the end wall with a second connector.

6. An assembly according to claim 1, wherein the at least one connecting bolt is sized to extend into the deck.

7. An assembly according to claim 1, wherein the second block unit further comprises a strip member that is positioned across at least a portion of a through-hole opening.

8. A shipping configuration for securing machinery on a deck using the assembly defined in claim 1, wherein the first block unit is welded to the deck, and wherein the second block unit is secured to the deck with at least one connecting bolt extending through the second block unit into the deck.

9. A shipping configuration according to claim 8, wherein the machinery base includes a front end piece, a back end piece, and side pieces connected between the front end piece and the back end piece, the shipping configuration comprising four of the first block unit, two each engaging the front end piece and the back end piece respectively, and two of the second block unit, one each engaging the side pieces, respectively.

10. An assembly for securing machinery on a deck, the machinery having a machinery base including a front end piece, a back end piece, and side pieces connected between the front end piece and the back end piece, the assembly comprising:
   a pair of first block units configured to restrict vertical displacement of the machinery relative to the deck, the first block units each including a base block securable to the deck and adjacent the front end piece and the back end piece of the machinery base, respectively, and an attachment block secured to the base block and extending axially over the front end piece and the back end piece, respectively, such that the attachment block is configured to extend over the machinery base; and
   a pair of second block units configured to restrict axial and lateral displacement of the machinery and securable to the deck, each of the second block units being respectively engageable with one of the side pieces of the machinery base.

11. An assembly according to claim 10, comprising two pairs of the first block units, one pair each securable adjacent the front end piece and the back end piece of the machinery base, respectively.

12. An assembly according to claim 10, wherein the base block of the first block unit comprises an upwardly facing support surface, and wherein the attachment block is secured to the upwardly facing support surface and extends axially beyond a boundary of the base block.

13. An assembly according to claim 12, wherein each of the second block units comprises a through-hole and a pin positioned in the through-hole, wherein the pin is extendable into the machinery base.

14. An assembly according to claim 12, wherein the base block of the first block unit comprises an end wall extending upwardly above the support surface, and wherein the attachment block is secured to the end wall and extends axially over the end wall.

15. An assembly according to claim 14, wherein the attachment block comprises a base section secured to the base block and a height adjusting section secured to the base section, the height adjusting extending axially beyond the boundary of the base block and being height adjustable to accommodate varying machinery base heights.

16. An assembly according to claim 15, wherein the height adjusting section comprises a first part engageable with the machinery base, a second part positioned over the first part, and a connector connected between the first part and the second part, wherein an upper surface of the first part comprises an incline and a lower surface of the second part comprises a reverse incline defining a two-part wedge, and wherein a height of the height adjusting section is a function of a relative axial position of the first part and the second part.

17. An assembly according to claim 15, wherein the base section of the attachment block is secured to the support surface with a first connector and is secured to the end wall with a second connector.

18. An assembly according to claim 12, wherein each of the second block units comprises a top half piece with a downwardly facing groove therein and a bottom half piece with an upwardly facing groove therein, the downwardly facing groove and the upwardly facing groove defining the through-hole, wherein the top half piece and the bottom half piece are connected to each other with at least one connecting bolt extending through the top half piece and the bottom half piece.

19. An assembly according to claim 18, wherein the at least one connecting bolt is sized to extend into the deck.

\* \* \* \* \*